US012287101B2

(12) United States Patent
Welch et al.

(10) Patent No.: US 12,287,101 B2
(45) Date of Patent: Apr. 29, 2025

(54) COMBINED COOLING, HEATING, AND POWER SYSTEM

(71) Applicant: Copeland LP, Sidney, OH (US)

(72) Inventors: Andrew M. Welch, Sidney, OH (US); Brian R. Butler, Sidney, OH (US)

(73) Assignee: Copeland LP, Sidney, OH (US)

( * ) Notice: Subject to any disclaimer, the term of this patent is extended or adjusted under 35 U.S.C. 154(b) by 109 days.

(21) Appl. No.: 17/729,582

(22) Filed: Apr. 26, 2022

(65) Prior Publication Data
US 2023/0341134 A1  Oct. 26, 2023

(51) Int. Cl.
F24D 3/18 (2006.01)
F24D 3/00 (2022.01)
(Continued)

(52) U.S. Cl.
CPC .............. F24D 3/005 (2013.01); F24D 3/18 (2013.01); F24D 19/1015 (2013.01);
(Continued)

(58) Field of Classification Search
CPC ........ F24D 3/005; F24D 3/18; F24D 19/1015; F24D 19/1045; F24D 2101/10; F24F 6/02; F24F 2110/20
See application file for complete search history.

(56) References Cited

U.S. PATENT DOCUMENTS 3,996,759 A * 12/1976 Meckler ............... F25B 29/003
165/104.31
4,066,118 A 1/1978 Goettl
(Continued)

FOREIGN PATENT DOCUMENTS

AU         589215 B2   10/1989
CA        1268636 B2    5/1990
(Continued)

OTHER PUBLICATIONS

SunTrac "How It Works: Hybrid Air Conditioning": SunTrac; 2021. https://suntracusa.com/how-it-works/.
(Continued)

Primary Examiner — Frantz F Jules
Assistant Examiner — Martha Tadesse
(74) Attorney, Agent, or Firm — Harness, Dickey & Pierce, P.L.C.

(57) ABSTRACT

A heating system of a building includes: a solar heater configured to receive sunlight and to at least one of absorb heat into a refrigerant and augment heat absorbed into the refrigerant; a compressor configured to compress the refrigerant that vaporized via absorption of heat; a first heat exchanger configured to transfer heat from the refrigerant to water; an expansion valve configured to reduce at least one of a temperature and a pressure of the refrigerant after the transfer of heat from the refrigerant to water; a second heat exchanger configured to transfer heat from water output from the first heat exchanger to air passing the second heat exchanger before flowing into the building; a pump configured to pump the water from the solar heater to the second heat exchanger; and a blower configured to blow air past the second heat exchanger and into the building.

20 Claims, 11 Drawing Sheets

(51) Int. Cl.
*F24D 19/10* (2006.01)
*F24F 6/02* (2006.01)
F24D 101/10 (2022.01)
F24F 110/20 (2018.01)

(52) U.S. Cl.
CPC ............ *F24D 19/1045* (2013.01); *F24F 6/02* (2013.01); *F24D 2101/10* (2022.01); *F24F 2110/20* (2018.01)

(56) References Cited

U.S. PATENT DOCUMENTS

| | | | |
|---|---|---|---|
| 4,103,493 A | 8/1978 | Schoenfelder | |
| 4,111,259 A | 9/1978 | Lebduska | |
| 4,123,003 A * | 10/1978 | Winston | F25B 9/004 62/235.1 |
| 4,211,207 A | 7/1980 | Molivadas | |
| 4,270,359 A * | 6/1981 | Hummel | F25B 30/06 62/238.7 |
| 4,350,200 A | 9/1982 | McElwain | |
| 4,351,161 A | 9/1982 | Jones | |
| 4,483,320 A | 11/1984 | Wetzel, Jr. et al. | |
| 4,512,157 A | 4/1985 | Weadock | |
| 4,522,253 A | 6/1985 | Levin | |
| 4,615,328 A | 10/1986 | Wetzel, Jr. | |
| 4,682,476 A | 7/1987 | Payre et al. | |
| 4,771,611 A | 9/1988 | McNab | |
| 5,613,372 A * | 3/1997 | Beal | F24F 3/153 62/238.7 |
| 5,884,492 A * | 3/1999 | Zwicky | F24F 11/0008 261/36.1 |
| 6,347,527 B1 * | 2/2002 | Bailey | F24F 3/001 165/59 |
| 7,234,314 B1 | 6/2007 | Wiggs | |
| 7,398,778 B2 | 7/2008 | Kaiser | |
| 7,441,558 B2 | 10/2008 | Leifer et al. | |
| 7,827,814 B2 | 11/2010 | Slater | |
| 8,790,451 B1 | 7/2014 | Narayanamurthy | |
| 9,267,711 B1 | 2/2016 | Ackner et al. | |
| 9,267,713 B2 | 2/2016 | Zamir | |
| 9,316,404 B2 | 4/2016 | Gurir | |
| 9,909,791 B2 | 3/2018 | Ma | |
| 10,041,702 B2 | 8/2018 | Lowrimore et al. | |
| 10,323,867 B2 | 6/2019 | Vandermeulen | |
| 10,371,126 B2 | 8/2019 | Tibbott et al. | |
| 10,598,392 B2 | 3/2020 | Dennis | |
| 10,882,772 B1 | 1/2021 | Wensel | |
| 11,041,635 B2 | 6/2021 | Walker | |
| 11,060,742 B2 | 7/2021 | Zhang et al. | |
| 2003/0129465 A1 * | 7/2003 | Nakamura | H01M 8/04164 429/410 |
| 2008/0083231 A1 * | 4/2008 | Wang | F24F 3/14 62/93 |
| 2009/0121488 A1 | 5/2009 | Bhatti et al. | |
| 2010/0031953 A1 | 2/2010 | Penev et al. | |
| 2010/0192606 A1 | 8/2010 | Isayama et al. | |
| 2010/0307169 A1 | 12/2010 | Diaz | |
| 2011/0290725 A1 * | 12/2011 | Al-Arifi | C02F 1/14 210/640 |
| 2012/0125019 A1 | 5/2012 | Sami | |
| 2012/0272948 A1 * | 11/2012 | Kristjansson | F24D 11/0228 165/104.11 |
| 2013/0126625 A1 | 5/2013 | Groskreutz | |
| 2015/0267946 A1 | 9/2015 | Lowstuter, Jr. et al. | |
| 2017/0074530 A1 | 3/2017 | Kozubal | |
| 2018/0087786 A1 | 3/2018 | Williams | |
| 2018/0266712 A1 | 9/2018 | Plourde et al. | |
| 2020/0182493 A1 | 6/2020 | Luttik | |
| 2021/0116159 A1 | 4/2021 | Bolwell | |

FOREIGN PATENT DOCUMENTS

| | | | | |
|---|---|---|---|---|
| CN | 105716314 A | | 6/2016 | |
| CN | 106931680 A | * | 7/2017 | ............ F25B 27/005 |
| EP | 1176373 A1 | | 1/2002 | |
| JP | 2000171105 A | | 6/2000 | |
| JP | 2010197030 A | * | 9/2010 | ............. F24S 20/40 |

OTHER PUBLICATIONS

International Search Report and Written Opinion for international application No. PCT/US2023/019731 mailed Aug. 17, 2023.

* cited by examiner

COMBINED COOLING, HEATING, AND POWER SYSTEM

FIELD

The present disclosure relates to cooling, heating, and power systems and more particularly to systems and methods that provide the combination of cooling, heating, and power generation.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Electric motors are used in a wide variety of industrial and residential applications including, but not limited to, heating, ventilating, and air conditioning (HVAC) systems. For example only, an electric motor may drive a compressor in an HVAC system. One or more additional electric motors may also be implemented in the HVAC system. For example only, the HVAC system may include another electric motor that drives a fan associated with a condenser. Another electric motor may be included in the HVAC system to drive a fan associated with an evaporator.

Refrigeration and HVAC systems are under increased regulatory pressure to reduce the global warming potential of the refrigerants they use. Refrigeration and HVAC systems are also under consumer pressure to minimize power consumption and improve efficiency.

SUMMARY

In a feature, a heating system of a building includes: a solar heater configured to receive sunlight and to at least one of absorb heat into a refrigerant and augment heat absorbed into the refrigerant; a compressor configured to compress the refrigerant that vaporized via absorption of heat; a first heat exchanger configured to transfer heat from the refrigerant to water; an expansion valve configured to reduce at least one of a temperature and a pressure of the refrigerant after the transfer of heat from the refrigerant to water; a second heat exchanger configured to transfer heat from water output from the first heat exchanger to air passing the second heat exchanger before flowing into the building; a pump configured to pump the water from the solar heater to the second heat exchanger; and a blower configured to blow air past the second heat exchanger and into the building.

In further features, a water vapor membrane configured to receive water output from the first heat exchanger and to selectively release water vapor into air passing the water vapor membrane and to selectively draw water vapor from air passing the water vapor membrane, where the blower is configured to blow air past the water vapor membrane.

In further features: a first valve is configured to regulate water flow from the first heat exchanger to the second heat exchanger; a second valve is configured to regulate water flow from the second heat exchanger to the water vapor membrane; and a valve control module is configured to selectively actuate the first valve and the second valve.

In further features, the valve control module is configured to open the first valve when a temperature of the air within the building is less than a temperature setpoint.

In further features, the valve control module is configured to open the second valve when a humidity of the air within the building is less than a humidity setpoint.

In further features: a water source is configured to output cold water to the second heat exchanger; a second water vapor membrane is disposed outside of the building and configured to selectively release water vapor to air outside of the building; and a compressor is configured to provide compressed water to the second water vapor membrane pump water from the second heat exchanger and the water vapor membrane.

In further features, a pump control module is configured to operate the pump when a temperature of the air within the building is greater than a setpoint temperature.

In further features, a pump control module is configured to operate the pump when a humidity of the air within the building is greater than a setpoint humidity.

In further features: a water source is configured to output cold water to the second heat exchanger; a valve is configured to regulate water flow from the water vapor membrane to the second heat exchanger; and a valve control module is configured to selectively open the valve when the blower is on based on at least one of (a) a temperature of the air within the building and (b) a humidity of the air within the building.

In further features, the valve control module is configured to open the valve when the blower is on and at least one of (a) the temperature of the air within the building is greater than a temperature setpoint and (b) the humidity of the air within the building is less than a humidity setpoint.

In further features, a hot water tank is configured to: receive warmer water output from the first heat exchanger; and to output colder water to the first heat exchanger.

In further features, a pump is configured to pump colder refrigerant from the first heat exchanger to the solar heater.

In further features, the first heat exchanger is a brazed plate heat exchanger.

In further features, the refrigerant is a natural refrigerant.

In further features, a pump is configured to pump the refrigerant to the solar heater, where: the solar heater is configured to evaporate the refrigerant; and the first heat exchanger condenses vapor refrigerant.

In further features, a pump is configured to pump the refrigerant to the solar heater.

In further features: a water source is included; a valve is configured to regulate water flow from the water source to the first heat exchanger; and a turbine is fluidly connected to an output of the first heat exchanger and configured to: rotate based on the output of the first heat exchanger; and convert generate electrical energy based on the rotation.

In further features, a charger is configured to charge a battery with the electrical energy.

In further features, a second water vapor membrane disposed outside of the building and configured to selectively release water vapor to air outside of the building, where the turbine outputs water to the second water vapor membrane.

In a feature, a heating method for a building includes: by a solar heater, receiving sunlight and at least one of absorbing heat into a refrigerant and augmenting heat absorbed into the refrigerant; by a compressor, compressing the refrigerant that vaporized via absorption of heat; by a first heat exchanger, transferring heat from the refrigerant to water; by a second heat exchanger, transferring heat from water output from the first heat exchanger to air passing the second heat exchanger before flowing into the building; by a pump, pumping the water from the solar heater to the second heat exchanger; and by a blower, blowing air past the second heat exchanger and into the building.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Some buildings may include a heater (e.g., radiant, forced air, etc.) that heats air within the building. Some buildings may also include an air conditioner that cools the air within the building. Buildings may include a hot water heater that heats water, such as for cooking, washing, etc. Some buildings may include solar heaters that can be used to heat the building.

The present application involves use of heating, cooling, and power generation in unconventional ways. For example, heating of air within a building can be performed using water heated by a solar heater. Concurrently, humidification of the air within the building can be performed with the water heated by the solar heater via a water vapor membrane that releases water vapor to air. As another example, cooling of air within a building can be performed using cool water from a water supply of the building. Concurrently, dehumidification of the air within the building can be performed by drawing water vapor from the air using the water vapor membrane. As another example, water heated by the solar heater can be provided to a hot water tank so the hot water tank need not heat the water itself. Water heated by the solar heater can also be used to generate power.

Figure 1:
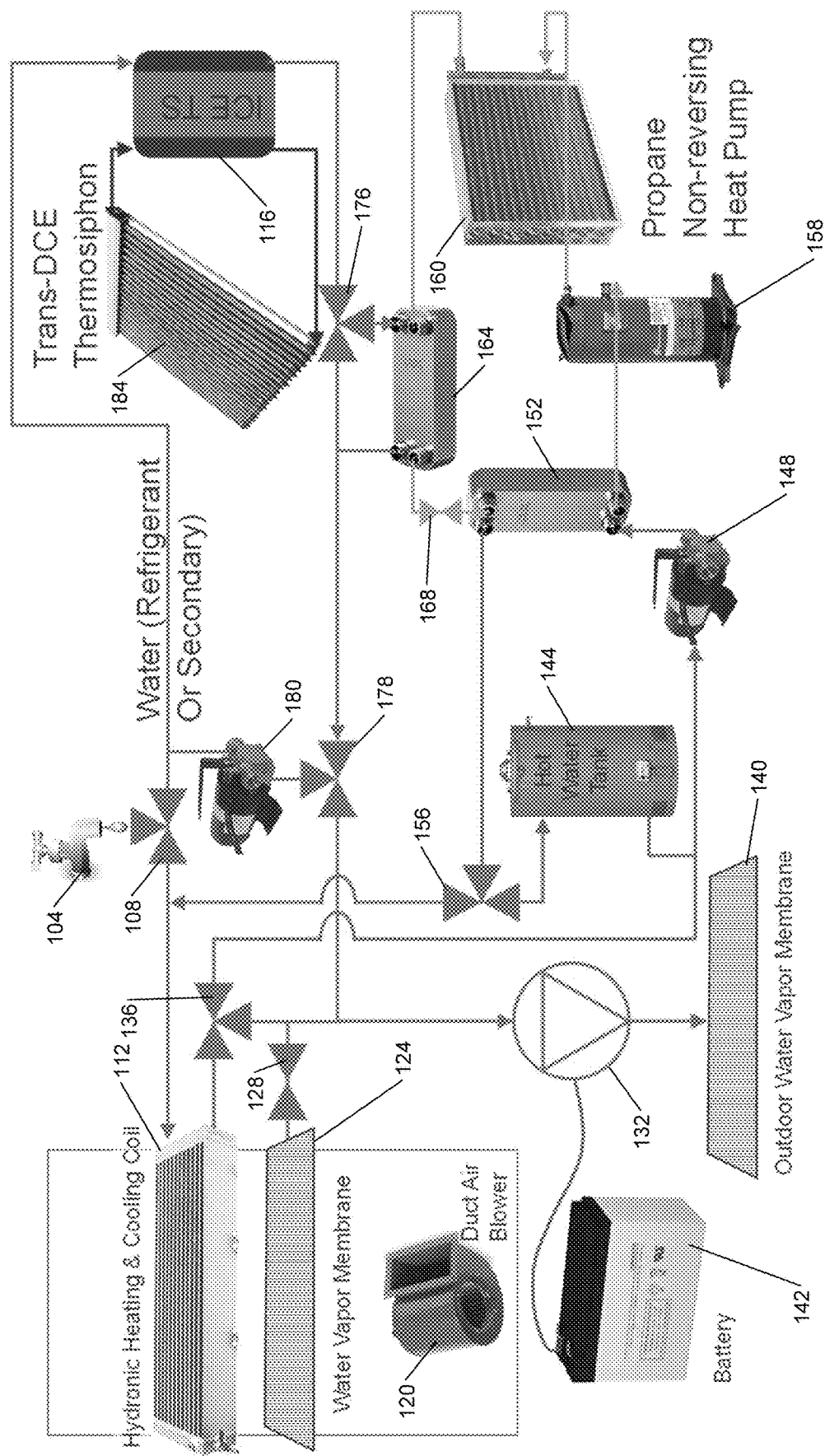
FIG. 1 is a functional block diagram of an example cooling, heating, and power generation system of a building.

FIG. 1 is a functional block diagram of an example cooling, heating, and power generation system of a building, such as a residential building (e.g., home) or a commercial or industrial building. While example components are described, one or more of the components shown and described may be omitted. One or more of the components may not be used during operation in various modes.

The heating, cooling, and power generation system is configured to heat space within the building, cool the space within the building, and generate power for one or more electrical components of the building. Water may be input to the system from a water supply 104, such as a well of the building or a municipal water line of the building. A three-way valve 108 regulates water flow to an indoor heat exchanger 112, an ice thermal storage (TS) 116, or both.

The indoor heat exchanger 112 is disposed within the building and is configured to heat or cool air within the building based on a temperature of water flowing through the indoor heat exchanger 112. When the temperature of the water is less than the air temperature within the building, the indoor heat exchanger 112 cools the air within the building by evaporating the water. When the temperature of the water is greater than the air temperature within the building, the indoor heat exchanger 112 warms the air within the building. Air flowing through the indoor heat exchanger 112 may flow into ducts of the building.

A blower 120 draws in air from within the building and blows the air past and through the indoor heat exchanger 112 to heat or cool the air within the building. The blower 120 also blows air through an indoor water vapor membrane 124. A valve 128 controls water flow to the water vapor membrane 124, for example, for humidification of the air within the building.

The indoor water vapor membrane 124 vaporizes water into water vapor when the humidity of the air within the building is low, such as when the valve 128 is open and water is flowing into the water vapor membrane 124. The indoor water vapor membrane 124 can be used to draw water from air when the valve 128 is open to decrease the humidity of the air within the building under other circumstances, such as when the humidity of the air within the building is high. The blower 120 may be turned on to increase a rate of dehumidification of the air within the building.

A compressor turbine 132 pumps water from the indoor heat exchanger 112 when a three-way valve 136 is open and from the indoor water vapor membrane 124 when the valve 128 is open. The compressor turbine 132 pumps water to an outdoor water vapor membrane 140 that is disposed outside of the building. The outdoor water vapor membrane 140 releases the water vapor to the air outside of the building. The compressor turbine 132 is an electric pump. A control module (discussed further below) controls application of power to the compressor turbine 132 from a battery 142. The compressor turbine 132 may be, for example, a water vapor compressor or another suitable type of pump.

A hot water tank 144 stores hot water within the building. The hot water brazed plate 144 may have, for example, a 30 gallon capacity, a 40 gallon capacity, a 50 gallon capacity, or another suitable capacity. The heated water can be supplied to sinks, showers, etc. A pump 148 pumps (heated) water from the hot water brazed plate 144 to a brazed plate heat exchanger 152 to be heated. Water output from the brazed plate heat exchanger 152 flows to a three-way valve 156. The three-way valve 156 regulates water flow to the indoor heat exchanger 112 (e.g., for heating with heated water), to the hot water tank 144, or both. The pump 148 is an electric pump. The control module (discussed further below) controls application of power to the pump 148 from the battery 142.

A refrigerant, such as propane or another suitable type of refrigerant, is also pumped through the brazed plate heat exchanger 152. The refrigerant may be a natural refrigerant. Natural refrigerant may mean a refrigerant that occurs in nature and is non-synthetic.

A compressor 158 pumps/compresses the (warmed) refrigerant vapor from an outdoor heat exchanger 160 to the brazed plate heat exchanger 152. Refrigerant within the outdoor heat exchanger 160 outside of the building absorbs heat from ambient air outside of the building thereby warming the refrigerant. The compressor 158 is electrically driven, such as a scroll, rotary, reciprocating, screw, centrifugal, or another suitable type of compressor or pump. The control module (discussed further below) controls application of power to the compressor 158, such as from the battery 142 or a utility (e.g., alternating current) connection of the building. Refrigerant within the brazed plate heat exchanger 152 warms water within the brazed plate heat exchanger 152.

Refrigerant output from the brazed plate heat exchanger 152 flows to a brazed plate heat exchanger 164. A valve 168, such as an expansion valve or another suitable type of valve, regulates refrigerant flow from the brazed plate heat exchanger 152 to the brazed plate heat exchanger 164.

Water output from the ice thermal storage 116 may also flow through the brazed plate heat exchanger 164, such as to warm the refrigerant in the brazed plate late heat exchanger 164 when the outdoor ambient air temperature is less than a predetermined value (e.g., 3 degrees Fahrenheit). A three-way valve 176 regulates water flow through the brazed plate heat exchanger 164 and water bypassing the brazed plate heat exchanger 164 and flowing to a three-way valve 178. Water output from the brazed plate heat exchanger 164 flows to the three-way valve 178. The three-way valve 178 regulates water flow to the circuit including the compressor turbine 132 and the valves 128 and 136 or water flow to a pump 180. The pump 180 is an electric pump. The control module (discussed further below) controls application of power to the pump 180, such as from the battery 142. The pump 180 pumps water to the ice thermal storage 116.

A solar heater 184 is disposed outside of the building and is heated by sunlight. The solar heater 184 warms refrigerant, such as trans dichloroethylene (trans-DCE) or another suitable type of refrigerant, within the solar heater. Warmed refrigerant output from the solar heater 184 warms water within the ice thermal storage 116. Cooled refrigerant output from the ice thermal storage 116 flows back to the solar heater 184. refrigerant flow to and from the solar heater 184 may be natural (e.g., via the refrigerant outlet being vertically higher than the refrigerant inlet) and the heating and cooling of the refrigerant.

The solar heater 184 may also be used to generate electrical power, as discussed further below. The power generated using the solar heater 184 may be used, for example, to charge the battery 142 and/or to power one or more components. The battery 142 may also be charged in one or more other ways, such as power generated by rotation of the compressor turbine 132 due to pressure within the system.

As discussed above, various components and portions of the system may be used for various modes of operation. Some components and portions of the system may be disabled and not used during various modes of operation.

Figure 2:
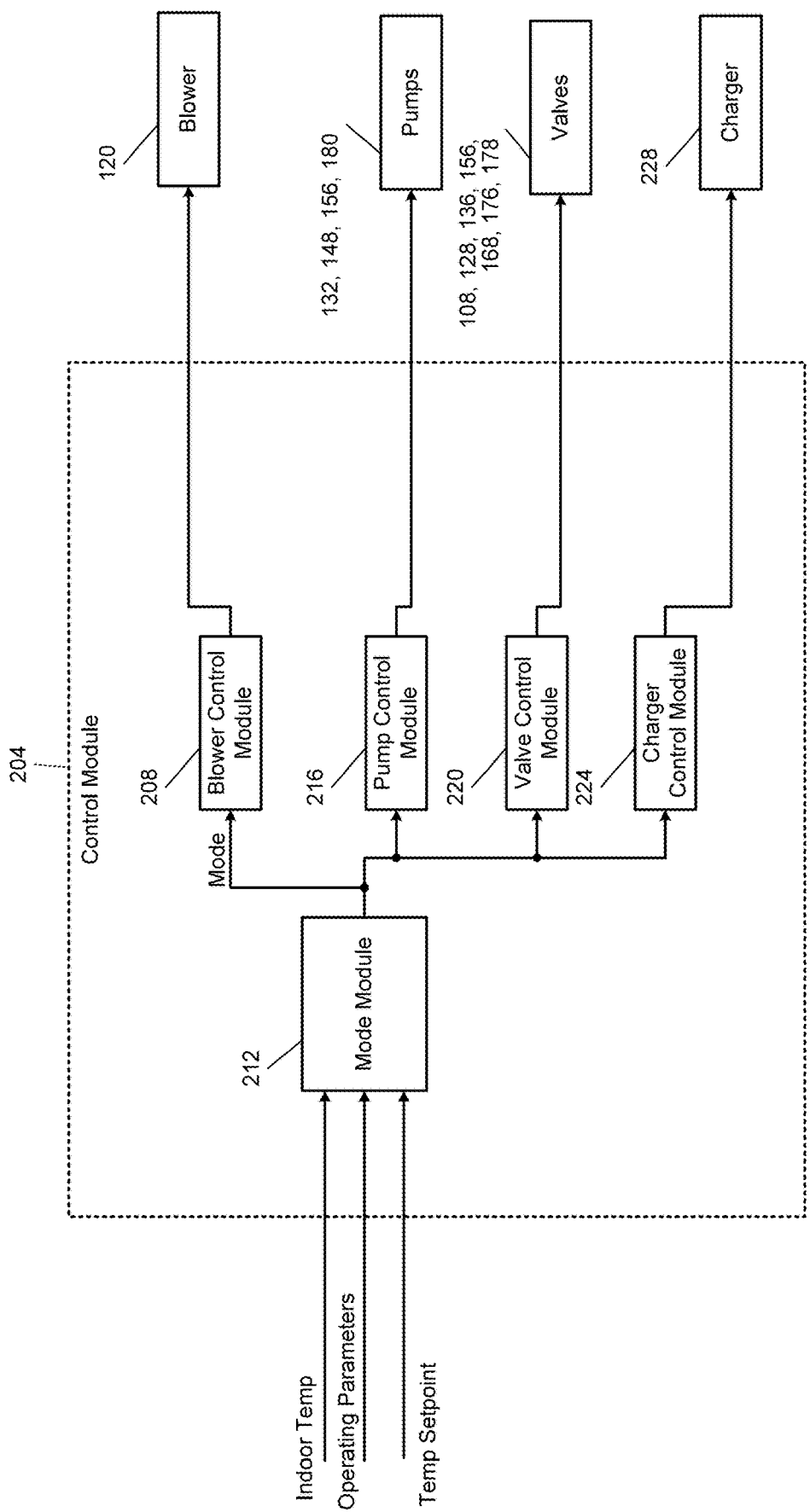
FIG. 2 is a functional block diagram of an example implementation of a control module.

FIG. 2 is a functional block diagram of an example implementation of the control module 204. A blower control module 208 controls operation of the blower 120. Operation may include whether the blower 120 is on or off and, if on, a speed of the blower 120. The blower control module 208 controls operation of the blower 120, for example, based on a mode set by a mode module 212.

A pump control module (or compressor control module) 216 controls operation of the devices 132, 148, 158, and 180 individually. Operation may include whether a pump is on or off and, if on, a speed of the pump. The pump control module 216 controls operation of the devices 132, 148, 158, and 180, for example, based on the mode set by the mode module 212.

A valve control module 220 controls operation of the valves 108, 128, 136, 156, 168, 176, and 178 individually. Operation may include whether a valve is open, closed, or positioned between open and closed. The valve control module 220 controls operation of the valves 108, 128, 136, 158, 168, 176, 178, for example, based on the mode set by the mode module 212.

A charger module 224 controls operation of a charger 228 that charges the battery 142. Operation of the charger 228 may include whether the charger 228 is charging or inactive, charging back to the power grid, and, if charging, an output (e.g., voltage, current, power) of the charger 228. In various implementations, the charger 228 may convert power such as from alternating current to direct current for charging the battery 142. In various implementations, the charger 228 may perform buck conversion and generate an output voltage that is less than an input voltage and/or perform boost conversion and generate the output voltage that is greater than the input voltage.

The mode module 212 may set the mode based on an air temperature within the building (indoor temp), an indoor air temperature setpoint (Temp setpoint), and one or more other operating parameters. Examples of the other operating parameters include, but are not limited to, indoor air humidity, outdoor air humidity, an indoor air humidity setpoint, a parameter (e.g., voltage) of the battery 142, and other operating parameters. The temp setpoint may be set via user input, such as to a thermostat within the building.

As an example, the mode module 212 may set the mode to heating when the indoor temp is less than the temp setpoint by at least a predetermined heating amount. The mode module 212 may set the mode to cooling when the indoor temp is greater than the temp setpoint by at least a predetermined cooling amount. The predetermined heating and cooling amounts may be set to predetermined values by default and may be adjusted via user input. The mode module 212 may set the mode to power generation when the voltage of the battery 142 is less than a predetermined voltage. The mode module 212 may set the mode to humidification when the humidity of the air within the building is less than the indoor air humidity setpoint by at least a predetermined amount. The mode module 212 may set the mode to dehumidification when the humidity of the air within the building is greater than the indoor air humidity setpoint by at least a predetermined amount. While example modes and conditions are provided, the present application is also applicable to other modes and conditions including, but not limited to other modes discussed below. Also, while an example arrangement of modules is provided, one or more of the modules may be implemented separately. In various implementations, multiple different modules may be used to control multiple components (e.g., pumps, valves) individually.

Figure 3:
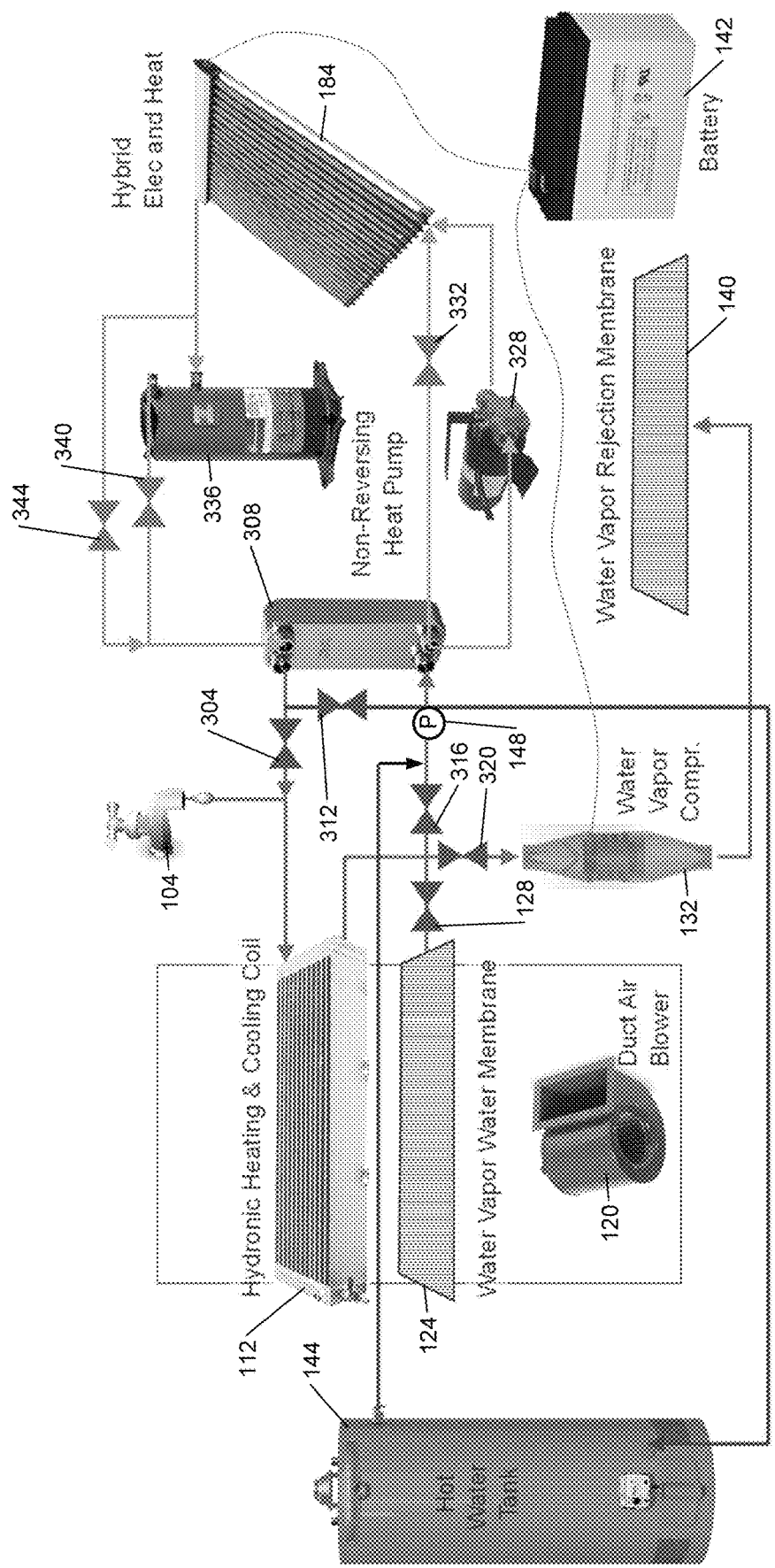
FIG. 3 is a functional block diagram of an example cooling, heating, and power generation system of the building.

FIG. 3 is a functional block diagram of an example cooling, heating, and power generation system of the building. In this example, a valve 304 controls water flow from a brazed plate heat exchanger 308 to the indoor heat exchanger 112. A valve 312 controls water flow to an input of the hot water tank 144. The hot water tank 144 in this example outputs warmed water to a point between the brazed plate heat exchanger 308 and a valve 316. The valve 316 controls water flow from the indoor heat exchanger 112 to the brazed plate heat exchanger 308.

A valve 320 controls water flow to the compressor turbine 132. The valve 128 controls water flow to and from the indoor water vapor membrane 124. As illustrated in FIG. 3, the battery 142 may be used to operate the compressor turbine 132. The compressor turbine 132 may also be used to convert mechanical energy into electrical power and charge the battery 142.

A pump 328 may pump refrigerant output from the brazed plate heat exchanger 308 to an input of the solar heater 184. A valve 332 may control refrigerant flow bypassing the pump 328 and flowing from the brazed plate heat exchanger 308 to the input of the solar heater 184. The valve 332 may be an expansion valve, such as a thermal expansion valve (TXV) or an electronic expansion valve (EXV). A compressor 336, such as a scroll, rotary, reciprocating, screw, centrifugal compressor or another suitable type of pump or compressor, may pump refrigerant out of the solar heater 184 and to the brazed plate heat exchanger 308. Warm refrigerant within the brazed plate heat exchanger 308 may warm water in the brazed plate heat exchanger 308. A valve 340 may control refrigerant flow from the compressor 336 to the brazed plate heat exchanger 308. A valve 344 may control refrigerant flow bypassing the compressor 336 and flowing from the solar heater 184 to the brazed plate heat exchanger 308. The pump and valve control modules 216 and 220 may control the pumps and valves of the example of FIG. 3.

Figure 4:
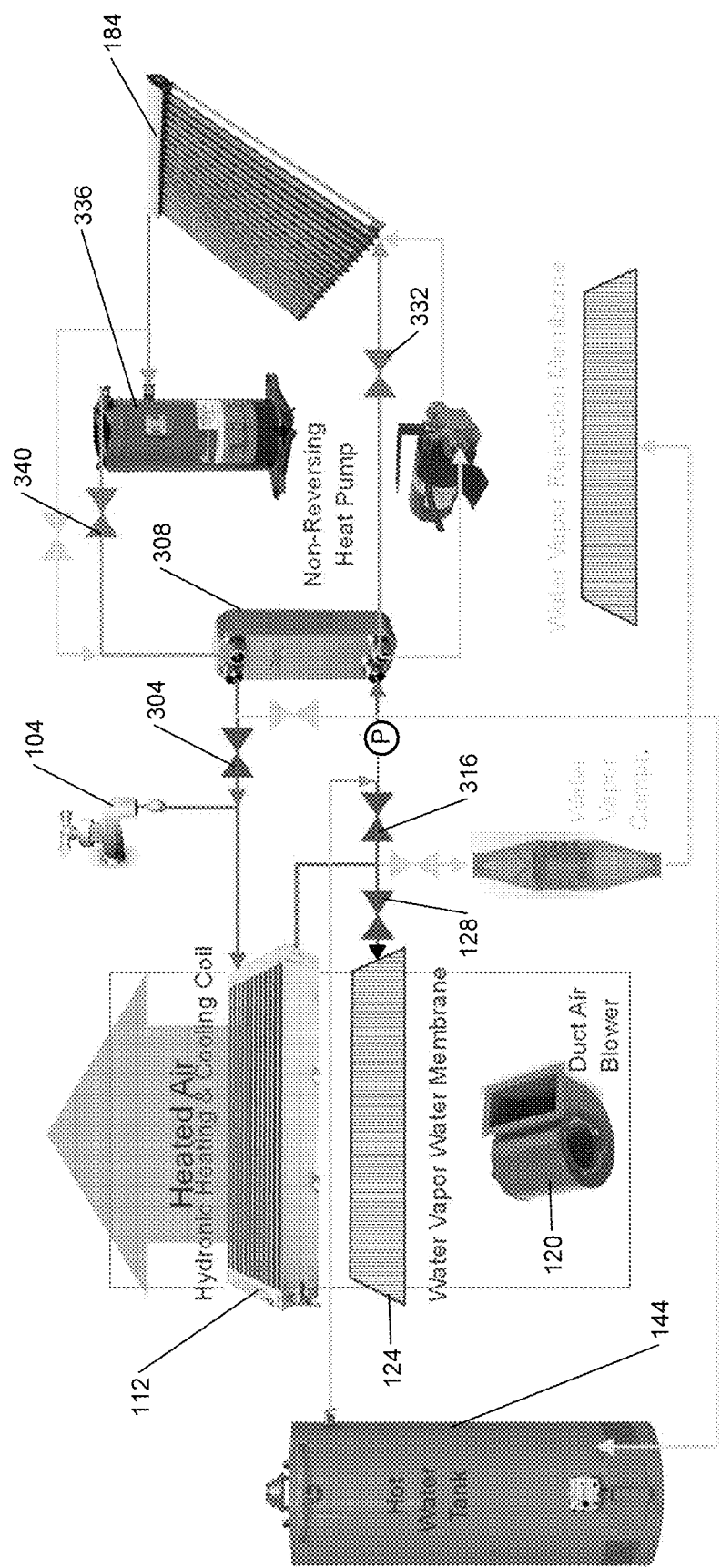
FIG. 4 is an example illustration of operation in a heating mode and a humidification mode.

FIG. 4 is an example illustration of operation in a heating mode and a humidification mode, such as when the indoor temp is less than the temperature setpoint and the humidity of the air in the building is less than the humidity setpoint. To warm the air within the building and increase the humidity of the air within the building, the blower control module 208 turns on the blower 120. Also, while the blower 120 is on, the valve control module 220 opens the valves 128, 316, 304, and 340 and turns on 104. The valve control module 220 closes the other valves. Opening the valves 304 and 316 circulates water through the indoor heat exchanger 112 and the brazed plate heat exchanger 308. Opening the valve 128 provides water to the indoor water vapor membrane 124, which releases water to the air being blown into the building. Concurrently the pump control module 216 operates the compressor 336 to pump the warm refrigerant from the solar heater 184 to the brazed plate heat exchanger 308, where the warm refrigerant warms water in the brazed plate heat exchanger 308 before the warm water flows into the indoor heat exchanger 112 for heating of the air within the building. Heating the air within the building in this manner is more efficient than heating the air within the building using a conventional furnace. Humidification can also be performed concurrently using the indoor water vapor membrane 124.

Figure 5:
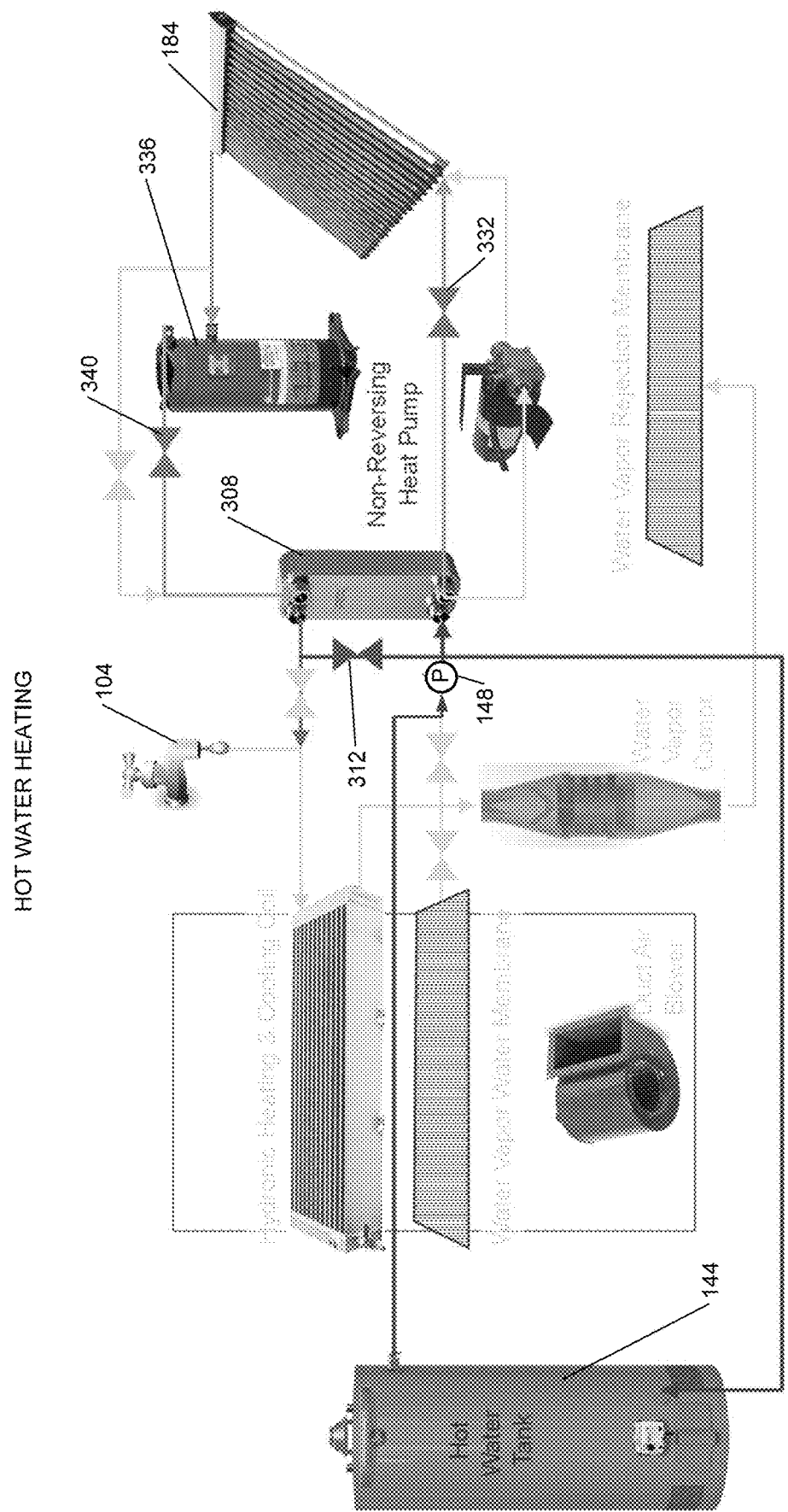
FIG. 5 is an example illustration of operation in a water heating mode.

FIG. 5 is an example illustration of operation in a water heating mode, such as when a temperature of the water within the water tank 144 is less than a temperature setpoint. To warm the water within the hot water tank 144, the valve control module 220 may open the valves 312 and 340. The valve control module 220 may close the other valves. Opening the valve 312 allows water to circulate through the brazed plate heat exchanger 308. While the valve 312 is open, the pump control module 216 operates the compressor 336 to pump the warm refrigerant from the solar heater 184 to the brazed plate heat exchanger 308, where the warm refrigerant warms water in the brazed plate heat exchanger 308 before the warm water flows back to the hot water tank 144. Heating the water using the solar heater 184 in this manner is more efficient than heating the water with a burner and/or an electric water heater. In various implementations, the hot water tank 144 may include an electric or gas burning water heater.

Figure 6:
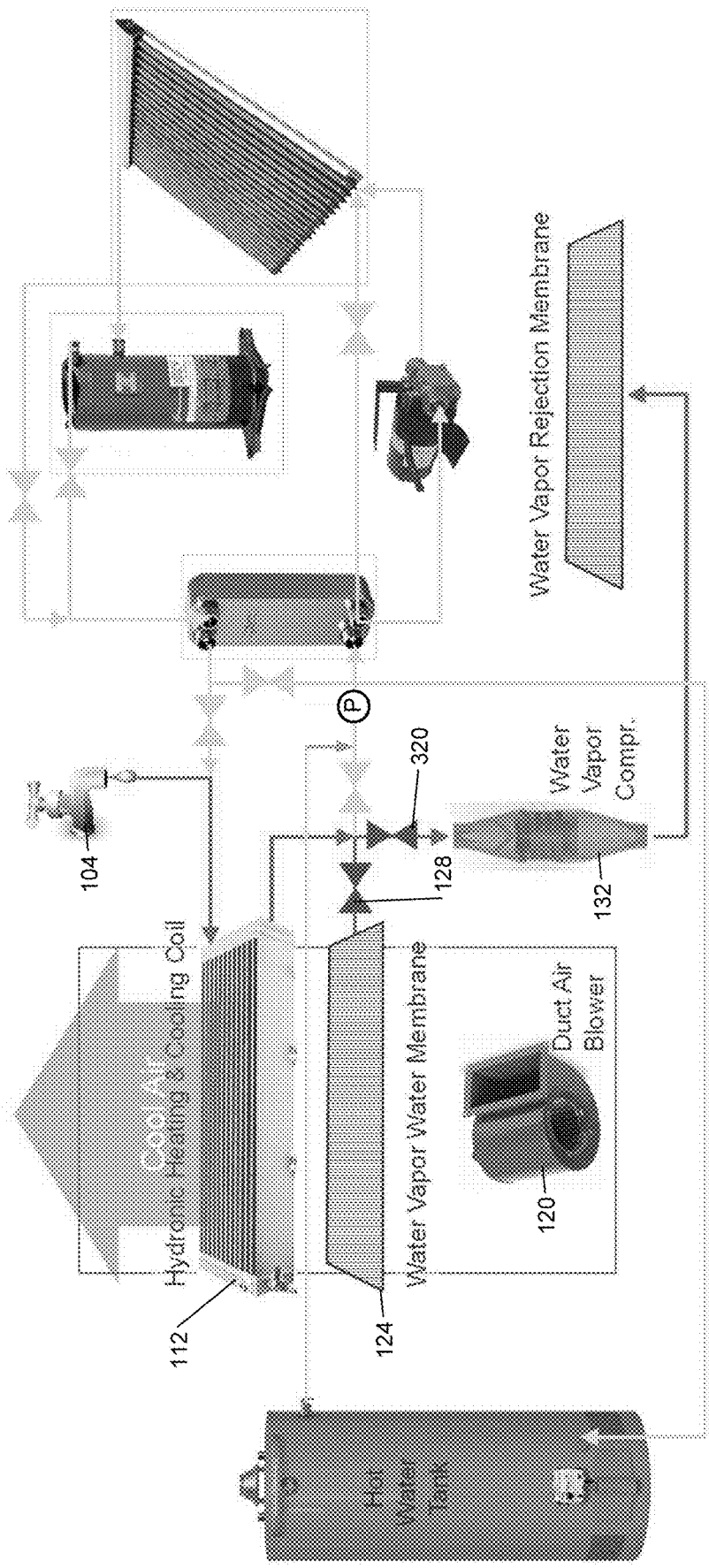
FIG. 6 is an example illustration of operation in a cooling mode and a dehumidification mode.

FIG. 6 is an example illustration of operation in a cooling mode and a dehumidification mode, such as when the indoor temp is greater than the temperature setpoint and the humidity of the air in the building is greater than the humidity setpoint. To cool the air within the building and decrease the humidity of the air within the building, the blower control module 208 turns on the blower 120. A water control module (of the control module 204) may also turn on the water supply 104 such that cool water flows through the indoor heat exchanger 112. Also, while the blower 120 is on, the valve control module 220 opens the valves 128 and 320. The valve control module 220 closes the other valves. The pump control module 216 operates the compressor turbine 132 to draw water from the indoor water vapor membrane 124 and through the indoor heat exchanger 112 to cool the air within the building. Drawing water from the indoor water vapor membrane 124 removes humidity from the air within the building. The compressor turbine 132 pumps the water vapor pressure to above the outdoor water vapor pressure and to the outdoor water vapor membrane 140, which releases the water to the air outside of the building. The mode module 212 may use the dehumidification mode, for example, when the humidity of the air outside of the building is less than the humidity of the air within the building and/or less than a predetermined humidity. Cooling the building in this manner may be more efficient than cooling the air within the building using an air conditioner because the heat sink becomes the outdoor dew point temperature. Dehumidification can also be performed concurrently with the cooling. Dehumidification, however, can be disabled by closing the valve 128.

Figure 7:
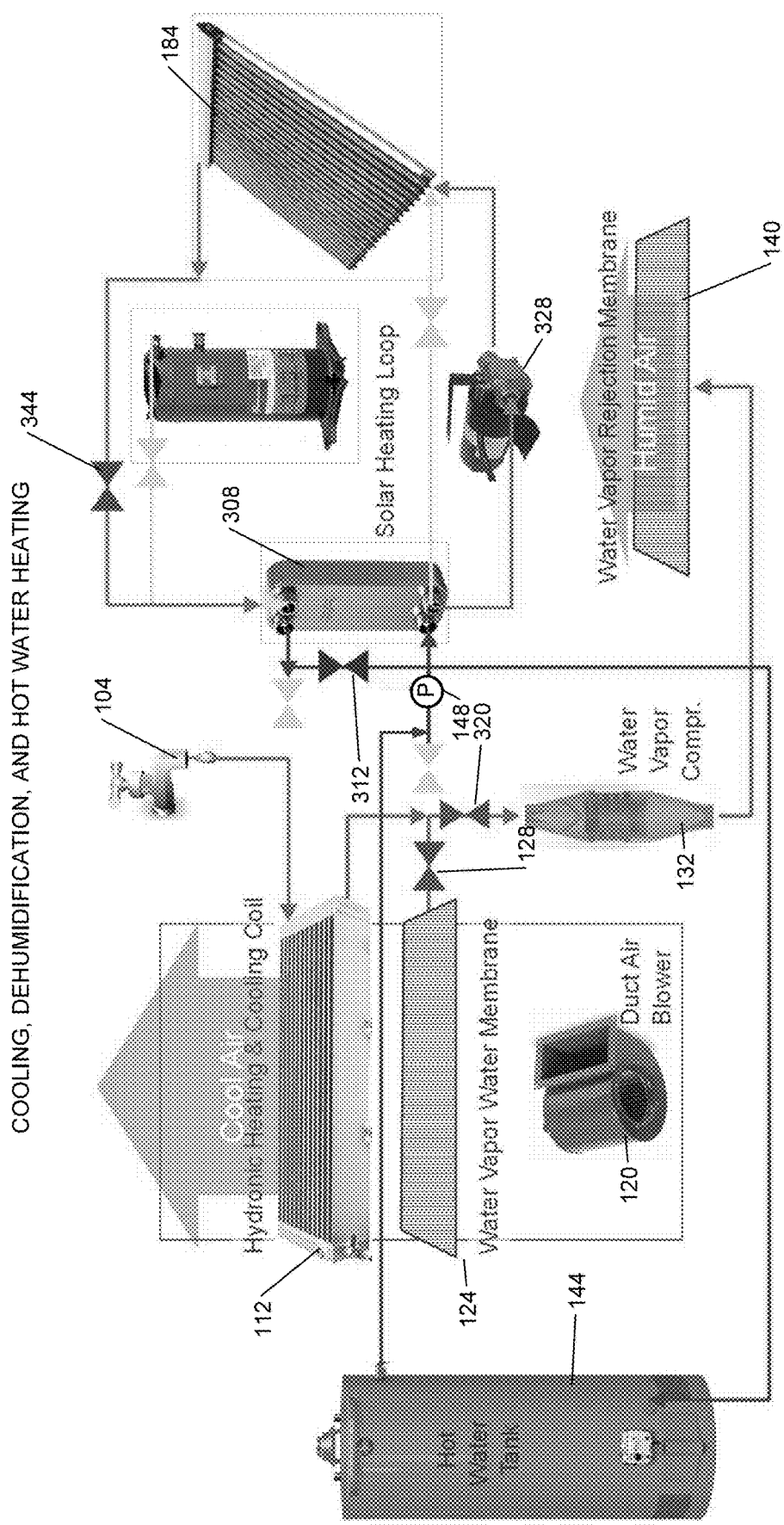
FIG. 7 is an example illustration of operation in a cooling mode and a dehumidification mode and in a hot water heating mode.

FIG. 7 is an example illustration of operation in a cooling mode and a dehumidification mode as in FIG. 6 and additional operating in a hot water heating mode. In various implementations, the hot water heating may be performed as in the example of FIG. 5. The dehumidification may be disabled during the cooling, performed during the cooling, or performed during part of the cooling and disabled during another part of the cooling. In various implementations, the cooling of FIG. 6 may be performed while the dehumidification is disabled, the dehumidification may be performed while the cooling is disabled, and the cooling and dehumidification may be performed concurrently.

The hot water heating may be performed, for example, when the temperature of the water in the hot water tank 144 is less than the setpoint temperature. In the example of FIG. 7, the valve control module 220 may open the valve 312 and the valve 344. The valve control module 220 may close the valve 340 and the valve 332. The pump control module 216 may, while the valves 340 and 332 are closed, operate the pump 328 to pump refrigerant into the solar heater 184. Warm refrigerant output from the solar heater 184 warms water in the brazed plate heat exchanger 308, and the warm water flows to the hot water tank 144. In this manner, cooling, dehumidification, and hot water heating can be performed concurrently and more efficiently than cooling using an air conditioner and hot water heating by the hot water tank 144.

Figure 8:
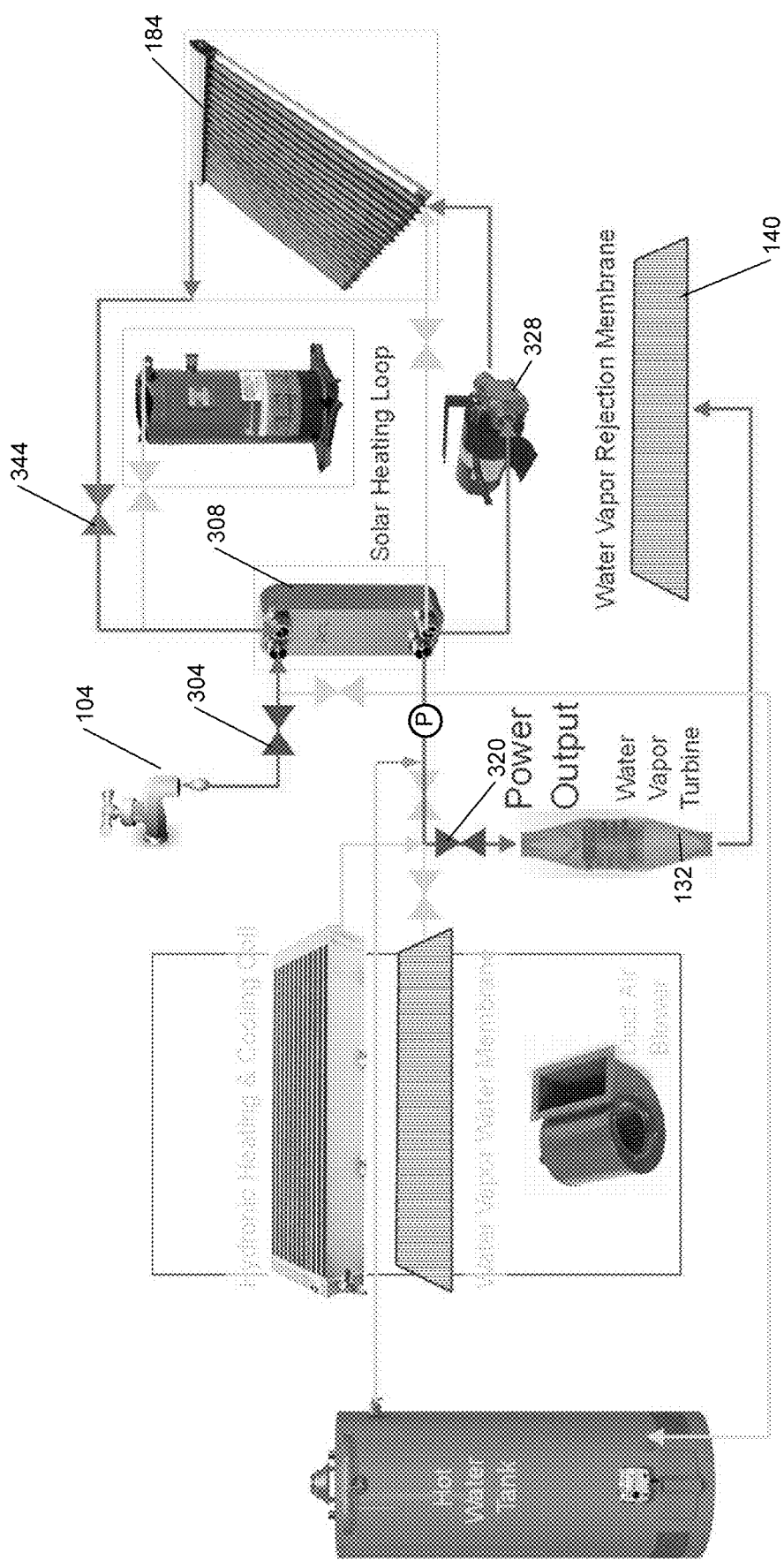
FIG. 8 is an example illustration of operation in a power generation mode.

FIG. 8 is an example illustration of operation in a power generation mode which may be performed, for example, when the compressor-turbine 132 is not in use for cooling and when water heating is not being performed. To generate power, the valve control module 220 opens the valves 304, 320 and 344. The water control module (of the control module 204) also turns on the water supply 104 such that cool water flows through the brazed plate heat exchanger 308. The valve control module 220 closes the other valves. The pump control module 216 operates the pump 328 to pump refrigerant into the solar heater 184 and refrigerant (warmed by the solar heater 184) warms water in the braze heat exchanger 308. The warmed water drives rotation of the compressor turbine 132, and the compressor turbine 132 converts the rotation into electrical power. The charger 228 charges the battery 142 using the power output by the compressor turbine 132. The compressor turbine 132 may be, for example, an axial compressor or another suitable type of pump/compressor. The outdoor water vapor membrane 140 releases water from the compressor turbine 132 to the air outside of the building.

Figure 9:
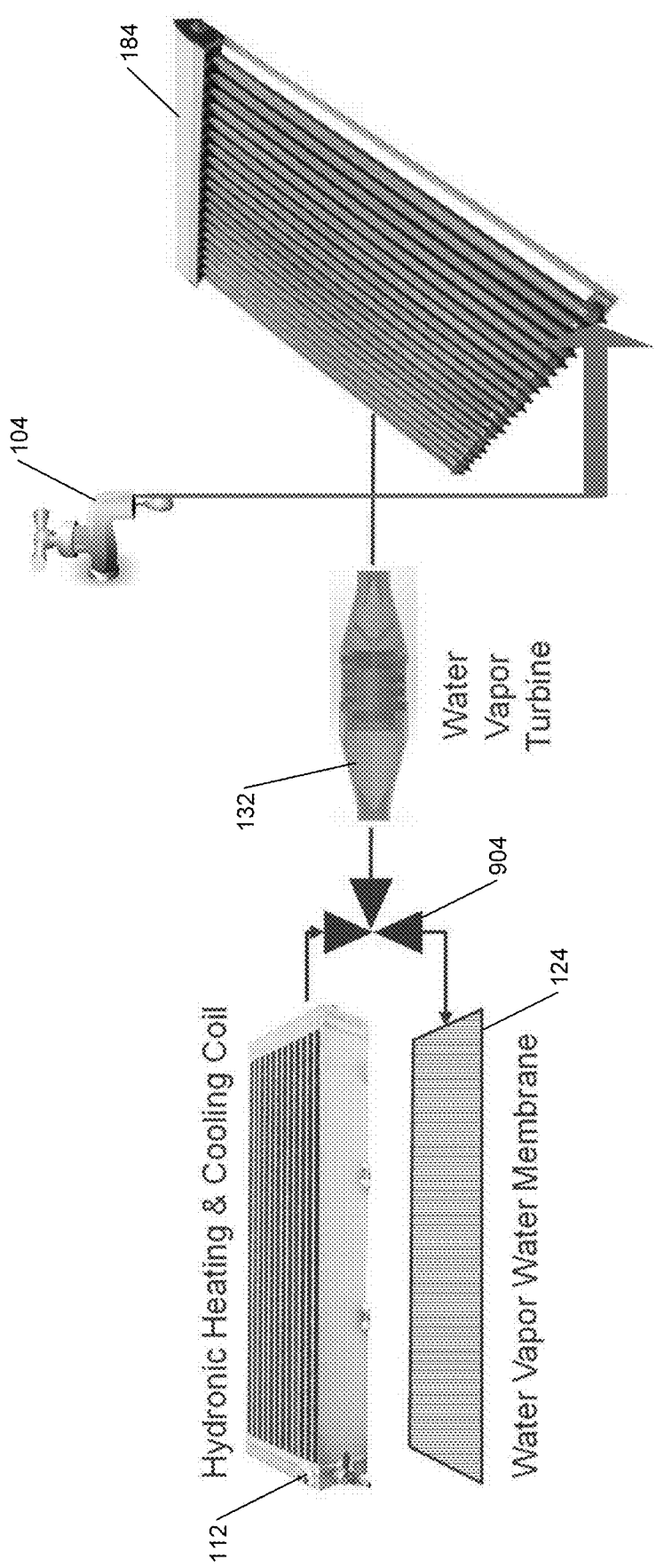
FIG. 9 is an example illustration of operation in a power generation mode during both day time and night time.

FIG. 9 is an example illustration of operation in a power generation mode during both day time and night time. During the day when ambient temperature outside of the building is greater than the ambient dew point temperature, the water control module controls the water supply 104 to input water to the solar heater 184. The solar heater 184 heats the water. The heated water drives rotation of the compressor turbine 132 which converts the rotation into electrical energy to charge the battery 142 or to power one or more other electrical components of the building. The water output from the compressor turbine 132 can be used to heat the air within the building via being supplied to the indoor heat exchanger 112 via a valve 904 and/or to humidify the air within the building being supplied to the indoor water vapor membrane 124 via the valve 904.

During the night, the ambient air temperature outside of the building and the solar device may be less than the ambient dry bulb temperature. The water vapor membrane 124 draws water from the air inside the building because of the influence of dark sky radiation. The water vapor drives rotation of the compressor turbine 132 which converts the rotation into electrical energy to charge the battery 142 or to power one or more other electrical components of the building. As used herein, heated water may refer to heated liquid water or water vapor.

Figure 11:
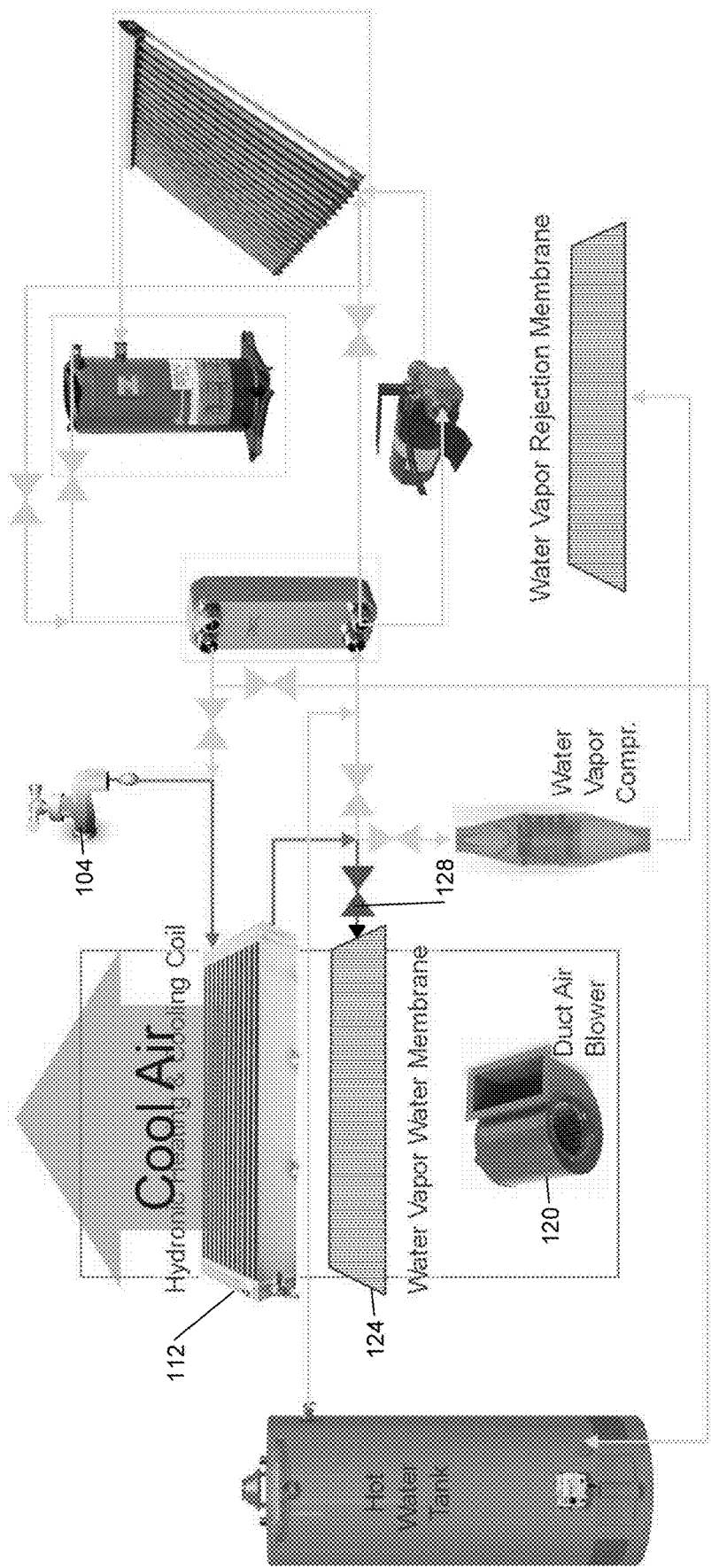
FIG. 11 is an example illustration of operation in a cooling mode and a humidification mode.

FIG. 11 is an example illustration of operation in a cooling mode and a humidification mode, such as when the indoor temp is greater than the temperature setpoint and the humidity of the air in the building is less than the humidity setpoint. To cool the air within the building and increase the humidity of the air within the building, the blower control module 208 turns on the blower 120. A water control module (of the control module 204) may also turn on the water supply 104 such that cool water flows through the indoor heat exchanger 112. Also, while the blower 120 is on, the valve control module 220 opens the valve 128 such that water flows to the indoor water vapor membrane 124. The valve control module 220 closes the other valves. The indoor water vapor membrane 124 releases water vapor to air, which cools the air and humidifies the air. The mode module 212 may use the humidification mode, for example, when the humidity of the air within the building is less than the humidity setpoint. Cooling and humidifying the air within the building in this manner may be more efficient than cooling the air within the building using an air conditioner. Humidification can also be performed concurrently with the cooling.

Figure 10:
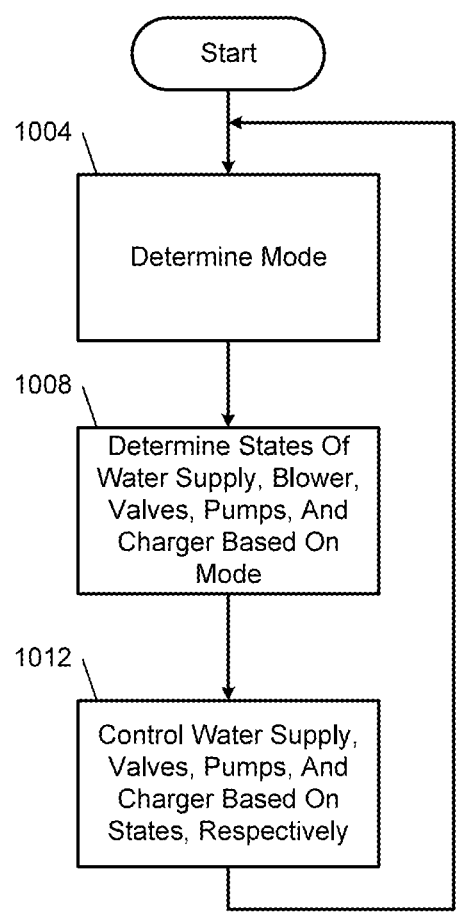
FIG. 10 is a flowchart depicting an example method of controlling the pumps, valves, and other actuators of the heating, cooling, and power generation system.

FIG. 10 is a flowchart depicting an example method of controlling the pumps, valves, and other actuators of the heating, cooling, and power generation system. Control begins with 1004 where the mode module 212 determines the mode, for example, based in the indoor temp, the temperature setpoint, the indoor humidity, the humidity setpoint, and/or one or more other operating parameters.

At 1008, the blower control module 208 determines a target state of operation for the blower 120, the water control module determines a target state of operation of the water supply 104, the pump control module 216 determines target states of operation of the pumps, respectively, the valve control module 220 determines target states of the valves, respectively, and the charger control module 224 determines a target state of operation of the charger 228. At 1012, the control modules actuate the actuators according to the target states, respectively. More specifically, the blower control module 208 controls operation of the blower 120 according to the target state, the water control module controls the water supply 104 according to its target state, the pump control module 216 controls operation of the pumps according to their target states, respectively, the valve control module 220 actuates the valves according to their target states, respectively, and the charger control module 224 operates the charger 228 according to its target state. Control returns to 1004 for a next loop.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A heating system of a building, the system comprising:
a solar heater configured to receive sunlight and to at least one of absorb heat into a refrigerant and augment heat absorbed into the refrigerant;
a compressor configured to compress the refrigerant that vaporized via absorption of heat;
a first heat exchanger configured to transfer heat from the refrigerant to water;
an expansion valve configured to reduce at least one of a temperature and a pressure of the refrigerant after the transfer of heat from the refrigerant to water;
a second heat exchanger configured to transfer heat from water output from the first heat exchanger to air passing the second heat exchanger before flowing into the building;
a pump configured to pump the water from a thermal storage that is fluidly connected with the solar heater to the second heat exchanger; and
a blower configured to blow air past the second heat exchanger and into the building.

2. The system of claim 1 further comprising a water vapor membrane configured to receive water output from the first heat exchanger and to selectively release water vapor into air passing the water vapor membrane and to selectively draw water vapor from air passing the water vapor membrane,
wherein the blower is configured to blow air past the water vapor membrane.

3. The system of claim 2 further comprising:
a first valve configured to regulate water flow from the first heat exchanger to the second heat exchanger;

a second valve configured to regulate water flow from the second heat exchanger to the water vapor membrane; and a valve control module configured to selectively actuate the first valve and the second valve.

4. The system of claim 3 wherein the valve control module is configured to open the first valve when a temperature of the air within the building is less than a temperature setpoint.

5. The system of claim 4 wherein the valve control module is configured to open the second valve when a humidity of the air within the building is less than a humidity setpoint.

6. The system of claim 2 further comprising:
a water source configured to output cold water to the second heat exchanger;
a second water vapor membrane disposed outside of the building and configured to selectively release water vapor to air outside of the building; and
a compressor configured to provide compressed water to the second water vapor membrane pump water from the second heat exchanger and the water vapor membrane.

7. The system of claim 6 further comprising a pump control module configured to operate the pump when a temperature of the air within the building is greater than a setpoint temperature.

8. The system of claim 6 further comprising a pump control module configured to operate the pump when a humidity of the air within the building is greater than a setpoint humidity.

9. The system of claim 2 further comprising:
a water source configured to output cold water to the second heat exchanger;
a valve configured to regulate water flow from the water vapor membrane to the second heat exchanger; and
a valve control module configured to selectively open the valve when the blower is on based on at least one of (a) a temperature of the air within the building and (b) a humidity of the air within the building.

10. The system of claim 9 wherein the valve control module is configured to open the valve when the blower is on and at least one of (a) the temperature of the air within the building is greater than a temperature setpoint and (b) the humidity of the air within the building is less than a humidity setpoint.

11. The system of claim 1 further comprising a hot water tank configured to:
receive warmer water output from the first heat exchanger; and
to output colder water to the first heat exchanger.

12. The system of claim 11 further comprising a pump configured to pump colder refrigerant from the first heat exchanger to the solar heater.

13. The system of claim 1 wherein the first heat exchanger is a brazed plate heat exchanger.

14. The system of claim 1 wherein the refrigerant is a natural refrigerant.

15. The system of claim 1 further comprising a pump configured to pump the refrigerant to the solar heater, wherein:
the solar heater is configured to evaporate the refrigerant; and
the first heat exchanger condenses vapor refrigerant.

16. The system of claim 1 further comprising a pump configured to pump the refrigerant to the solar heater.

17. The system of claim 1 further comprising:
a water source;
a valve configured to regulate water flow from the water source to the first heat exchanger; and
a turbine fluidly connected to an output of the first heat exchanger and configured to:
rotate based on the output of the first heat exchanger; and
convert generate electrical energy based on the rotation.

18. The system of claim 17 further comprising a charger configured to charge a battery with the electrical energy.

19. The system of claim 17 further comprising a second water vapor membrane disposed outside of the building and configured to selectively release water vapor to air outside of the building,
wherein the turbine outputs water to the second water vapor membrane.

20. A heating method for a building, the method comprising:
by a solar heater, receiving sunlight and at least one of absorbing heat into a refrigerant and augmenting heat absorbed into the refrigerant;
by a compressor, compressing the refrigerant that vaporized via absorption of heat;
by a first heat exchanger, transferring heat from the refrigerant to water;
by a second heat exchanger, transferring heat from water output from the first heat exchanger to air passing the second heat exchanger before flowing into the building;
by a pump, pumping the water from a thermal storage that is fluidly connected with the solar heater to the second heat exchanger; and
by a blower, blowing air past the second heat exchanger and into the building.

\* \* \* \* \*